April 8, 1969  N. LAING  3,437,855

AIR COOLED ELECTRIC MOTOR

Filed Aug. 1, 1967

INVENTOR
NIKOLAUS LAING

BY

ATTORNEYS

United States Patent Office 3,437,855
Patented Apr. 8, 1969

3,437,855
AIR COOLED ELECTRIC MOTOR
Nikolaus Laing, 35–37 Hofener Weg, 7141 Aldingen,
near Stuttgart, Germany
Filed Aug. 1, 1967, Ser. No. 657,546
Int. Cl. H02k 9/06
U.S. Cl. 310—62                                   8 Claims

ABSTRACT OF THE DISCLOSURE

Forced air cooling means for an electrical motor enclosed within a thermally conductive metal jacket in which a motor driven rotary blower within the jacket induces a flow of air into the jacket and over interior vanes to convectively cool the jacket, the air then being forced through tangential slits within the jacket wall to project a tangential spiral flow of air over the exterior jacket surface to further convectively cool the jacket.

BACKGROUND OF THE INVENTION

Field of the invention

This invention relates to air-cooled electrical motors and specifically relates to improved forced air cooling means for electrical motors enclosed within a thermally conductive metal jacket in which a motor driven rotary blower within the jacket induces a flow of air into the jacket and over interior vanes to convectively cool the jacket, the air then being forced through tangential slits formed within the jacket wall which project a tangential spiral flow of air over the exterior jacket surface to further convectively cool the jacket.

Description of the prior art

Jacket-cooled electrical motors of the prior art require exterior fins for forced air convective cooling. The use of such exterior vanes substantially increases the diameter of the motor jacket and hence the space required for installation of the motor. In a number of known designs for air-cooled motors, cooling is effected by forcing a flow of air over the exterior surface of the motor jacket. However, in designs of this nature, it has also been found necessary to provide exterior deflectors and fins to insure a sufficient thermal contact of the air flow with the exterior jacket surface.

The present invention provides forced air cooling means for jacketed electrical motors by forcing cooling air over interior vanes and by projecting the air through slits in the motor jacket to cause a tangential spiral flow over the exterior jacket surface without the necessity of external fins or deflection devices. By means of this invention, electrical motors may be efficiently cooled without extending the diameter of the jacket substantially beyond that of the motor.

Summary of the invention

The present invention finds utility in an electrical motor provided with a cylindrical metal jacket having good heat conduction properties. The jacket of this invention defines an integral upper jacket wall provided with an end wall and an integral lower jacket wall enclosing the electrical motor with its rotor substantially parallel to the axis of the jacket and its stator in contact with the lower jacket wall for heat conduction.

A forced air cooling means of this invention encompasses a rotary blower impeller located within the upper jacket wall and connected for rotation with the rotor in a selected direction. A plurality of circumferentially spaced slits are located in the upper jacket wall for the passage of air, the slits slanted at an angle from the axis of said jacket and formed inwardly in a direction nearly tangential to the upper jacket wall and opposite the direction of impeller rotation. Preferentially the slits are slanted at an angle from about 30 degrees to about 60 degrees. As the motor is operated, the blower impeller rotating with the rotor projects air from within the jacket through the slits into a tangential spiral flow over the exterior surface of the upper and lower jacket walls to convectively cool the motor.

This invention further encompasses an additional forced air cooling means to be used by itself or in conjunction with the above described cooling means. The additional means encompasses a plurality of metal vanes located within the upper jacket wall and connected therewith for heat conduction, the vanes spaced around the blower impeller to receive a flow of air induced by the impeller as it rotates, so that as the motor is operated, the blower impeller rotating with said rotor induces a flow of air into and out of the jacket to convectively cool the vanes, thereby creating a temperature differential between the upper jacket wall and the lower jacket wall to conductively cool the motor.

DESCRIPTION OF THE PREFERRED EMBODIMENTS

First preferred embodiment

Figure 1:
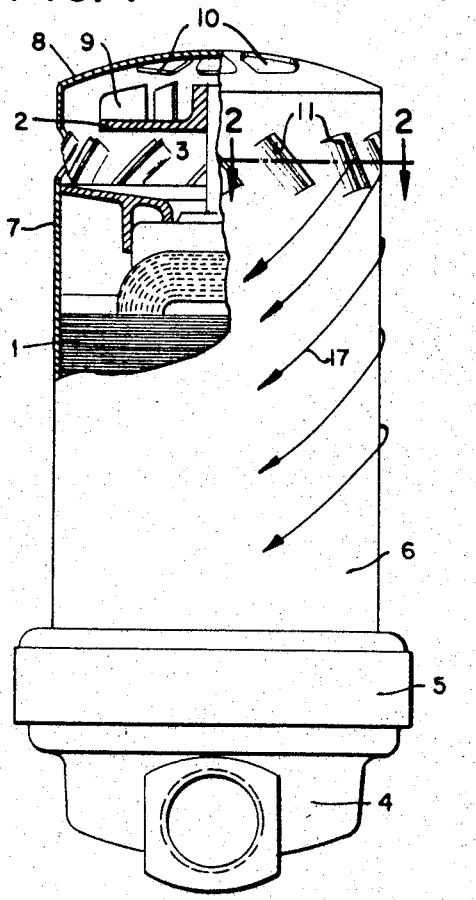
FIG. 1 is a side view in partial cross-section of a forced air cooled motor incorporating a first preferred form of the present invention, which is mounted by means of a screw cap to operate a conventional liquid pump.

The first preferred embodiment of this invention is depicted in FIG. 1 which comprises a motor 1 enclosed within a cylindrical metal jacket 6 having good heat conduction properties. A rotary blower impeller 2 provided with radial blower vanes 9 is located in the upper portion of the metal jacket 6 and is connected for rotation with rotor shaft 3. As the motor 1 is operated, the blower impeller 2 rotates with shaft 3 to draw air into the interior of jacket 6 through openings 10 located in the end wall 8. The impeller 2 then forces the air through slits 11 which are formed in the jacket wall 7 and circumferentially spaced around the upper portion of the jacket 8.

Figure 2:
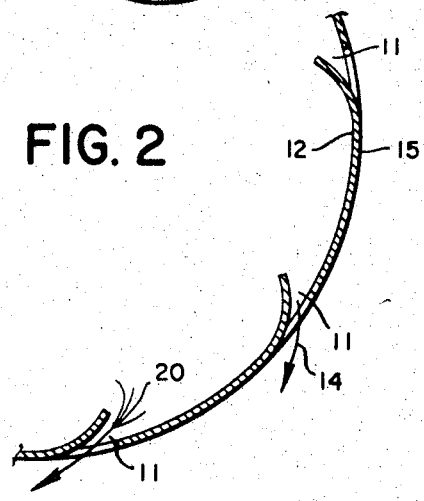
FIG. 2 is a cross-sectional vertical view of a portion of the jacket of the motor depicted in FIG. 1 taken along line 2—2 which illustrates the configuration of slits in the jacket wall.

As can be seen from a reference to both FIGS. 1 and 2, the slits 11 are slanted at an angle of 45 degrees from the axis of jacket 8 and are formed inwardly in a direction nearly tangential to the upper jacket wall and opposite to the direction of impeller rotation. As the motor 1 is operated, the blower impeller 2 projects air from within the upper portion of jacket 8 through slits 11 to produce a tangential spiral flow (indicated by arrows 17) over the exterior of jacket 8. The tangential flow of air adheres by cohesive action to the exterior of the jacket and thereby convectively cools the motor 1 which is in thermal contact with the interior wall of jacket 6.

FIG. 2 is a detailed cross-sectional vertical view of a portion of slits 11 formed in the wall 7 of the upper portion of the jacket 6. For effective cooling, slits 11 are slanted at an angle of from 30 degrees to 60 degrees with respect to the axis of the jacket 6. The slits 11 are formed inwardly from the exterior surface of the jacket 6 in a direction nearly tangential to the jacket wall 7. The interior end of slits 11 form a gap 20 which converges in the direction of the outward flow of air indicated by arrow 14, the convergence of the slits 11 acting as a means to accelerate the flow of air from the interior of the jacket 6. As the flow of air 14 leaves slits 11, the flow is nearly tangential to the exterior 15 of the jacket 6. The nearly tangential flow of air 14 adheres to the exterior wall 15 by means of cohesive attraction and forms a tangential spiral flow 17 down the length of the jacket to provide convective cooling.

*Second preferred embodiment*

Figure 3:
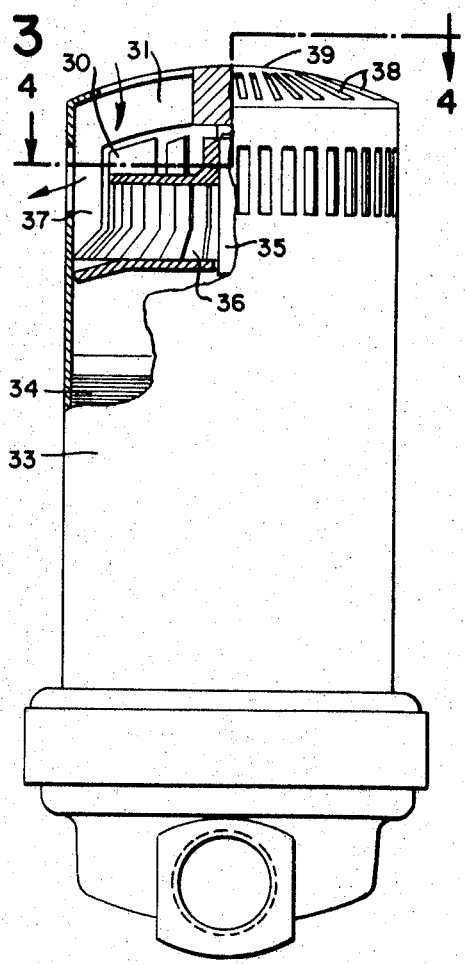
FIG. 3 is a side view in partial cross-section of a forced air cooled motor incorporating a second preferred form of the present invention which is mounted by means of a screw cap to operate a conventional liquid pump.

A second preferred embodiment of the present invention, depicted in FIG. 3, may be used as a cooling means by itself or in combination with the preferred embodiment described with respect to FIG. 1. This embodiment encompasses a motor 34 located within the lower portion of a cylindrical metal jacket 33 which is connected by rotor shaft 35 to a rotary blower impeller 36 provided with radial vanes 30 which is located in the upper portion of jacket 33. Openings 38 are equally spaced in a circular configuration around the top portion 39 of the jacket 33 and the corresponding openings 32 are located circumferentially around the upper portion of jacket 33 around impeller 36. Internal vanes 37 are located in contact with the wall of the metal casing for thermal conduction and are positioned between a pair of corresponding openings 38 in the top of the metal casing and a pair of corresponding openings 37 located in the upper portion of jacket 33. As the motor is operated, the blower impeller 36 rotates with shaft 35 to draw air into casing 33 through openings 38 and to subsequently expel air through openings 32 causing the flow of air over vanes 37 which effect a convective cooling of the upper portion of the jacket wall. Cooling the upper portion of the jacket creates a temperature differential between the upper and lower portions of jacket 36 to induce the conduction of heat from motor 34 through jacket 33.

Figure 4:
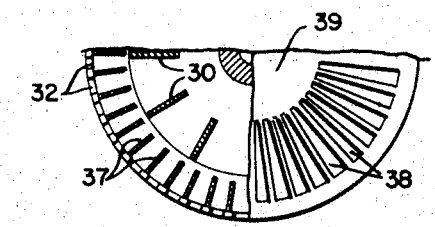
FIG. 4 is a vertical view in partial cross-section of the upper portion of the jacket of the motor depicted in FIG. 3 taken along line 4—4.

FIG. 4 is a vertical view of the top portion 39 of the motor casing. As can be seen from FIG. 4, the interior vanes 37 are equally spaced between pairs of openings 32 and are generally oriented vertically to the axis of the jacket. Preferentially the openings 32 are of the slit configuration of the preferred embodiment described in conjunction with FIG. 1 to cause tangential spiral flow of air over the jacket 33 to further aid in the cooling of motor 34.

The above description, and particularly the preferred embodiments, are set forth by way of illustration only. It will be understood by those skilled in the art that many modifications and variations may be made thereon without departing from the spirit and scope of the present invention as is more particularly defined below in the appended claims.

I claim:

1. In an electrical motor provided with a cylindrical metal jacket having heat conduction properties, said jacket defining an integral upper jacket wall provided with an end wall and integral lower jacekt wall enclosing said electrical motor with its rotor substantially parallel to the axis of said jacket and its stator in contact with the lower jacket wall for heat conduction, the improvement in combination therewith of forced air cooling means comprising:
   (a) a rotary blower impeller located within said upper jacket wall and connected for rotation with said rotor,
   (b) a plurality of circumferentially spaced outlet openings in said upper jacket wall for the passage of air, and
   (c) inlet openings in said end wall whereby air may be drawn into said jacket, whereby as said motor is operated, the blower impeller rotating with said rotor projects air from within said jacket through said outlet openings and over a portion of the upper jacket convectively cool said motor.

2. In an electrical motor provided with a cylindrical metal jacket having heat conduction properties, said jacket defining an integral upper jacket wall provided with an end wall and an integral lower jacket wall enclosing said electrical motor with its rotor substantially parallel to the axis of said jacket and its stator in contact with the lower jacket wall for heat conduction, the improvement in combination therewith of forced air cooling means comprising:
   (a) a rotary blower impeller located within said upper jacket wall and connected for rotation with said rotor in a selected direction, and
   (b) a plurality of circumferentially spaced slits in said upper jacket wall for the passage of air, said slits slanted at an angle from the axis of said jacket and formed inwardly in a direction nearly tangential to the upper jacket wall and opposite said direction of impeller rotation, whereby as said motor is operated, the blower impeller rotating with said rotor projects air from within said jacket through said slits into a tangential spiral flow over the exterior surface of said upper and lower jacket walls to convectively cool said motor.

3. The improvement of forced air cooling means described in claim 2 in which said slits are slanted at an angle of from about 30 degrees to about 60 degrees from the axis of said jacket.

4. The improvement of forced air cooling means described in claim 2 in which:
   (a) the interiors of said upper and lower jacket walls are partitioned by a dividing wall, and
   (b) at least one opening is located in said end wall for the passage of air into the interior of said jacket.

5. In an electrical motor provided with a cylindrical metal jacket having heat conduction properties, said jacket defining an integral upper jacket wall provided with an end wall and an integral lower jacket wall enclosing said electrical motor with is rotor substantially parallel to the axis of said jacket and its starter in contact with the lower jacket wall for heat conduction, the improvement in combination therewith of forced air cooling means comprising:
   (a) a rotary blower impeller located within said upper jacket wall and connected for rotation with said rotor,
   (b) a plurality of openings located in said jacket for the passage of a flow of air into and out of said jacket induced by said blower impeller as it rotates, and
   (c) a plurality of metal vanes located within said upper jacket wall and connected therewith for heat conduction, said vanes spaced around said blower impeller to receive said flow of air induced by said impeller as it rotates, whereby as said motor is operated, the blower impeller rotating with said rotor induces a flow of air through said openings into and out of said jacket to convectively cool said vanes, thereby creating a temperature differential between said upper jacket wall and said lower jacket wall to conductively cool said motor.

6. The improvement of forced air cooling means described in claim 5 in which:
   (a) the interior of said upper and lower jacket walls are partitioned by a wall, and
   (b) said openings are located in said upper jacket wall and said end wall for the passage of air into and out of the interior of said upper jacket wall.

7. The improvement of forced air cooling means described in claim 5 in which:
   (a) said metal vanes are spaced around said impeller in an orientation substantially parallel to the axis of said jacket, said vanes extending from said upper jacket wall to said end wall and connected therewith for heat conduction, (b) a plurality of openings in said end wall for the passage of air, said openings circularly spaced around said end wall with each opening located between a corresponding pair of said metal vanes, and (c) a plurality of openings in the upper jacket wall, said openings spaced circumferentially around said upper jacket wall with each opening located between a corresponding pair of said metal vanes, whereby, as said motor is operated, the blower impeller rotating with said rotor induces a flow of air through said openings into and out of said upper jacket portion, said vanes convectively cooled by a flow of air between each pair of said vanes thereby creating a temperature differential between said upper jacket wall and said lower wall to conductively cool said motor.

8. The improvement of forced air cooling means described in claim 5 in which said metal vanes form an integral portion of the upper jacket wall.

References Cited

UNITED STATES PATENTS 2,936,774   5/1960   Holley et al. _____ 310—62

FOREIGN PATENTS 589,762   11/1933   Germany.
632,663   11/1934   Germany.

WARREN E. RAY, *Primary Examiner.*

R. SKUDY, *Assistant Examiner.*